United States Patent
Fischer

[15] 3,648,572
[45] Mar. 14, 1972

[54] DISMOUNTABLE CYLINDER FOR RECIPROCABLE PISTON MACHINES

[72] Inventor: Hans Fischer, Nurnberg, Germany

[73] Assignee: Maschinenfabrik Augsburg-Nurnberg Aktiengesellschaft Zweigniederlassung Nurnberg, Nurnberg, Germany

[22] Filed: Mar. 27, 1970

[21] Appl. No.: 23,248

[30] Foreign Application Priority Data

Mar. 27, 1969 Germany .................P 19 15 726.7

[52] U.S. Cl. ..................92/169, 92/171, 123/193 CH
[51] Int. Cl. .......................F16j 11/02, F16j 11/04
[58] Field of Search ..........92/169, 171; 123/193 H, 193 CH, 123/193 C

[56] References Cited

UNITED STATES PATENTS

| 1,220,335 | 3/1917 | Heinze, Jr. | 92/171 X |
|---|---|---|---|
| 1,825,769 | 10/1931 | Barbarou | 123/193 CH |
| 1,951,948 | 3/1934 | Pobjoy | 123/193 Ch |
| 2,144,928 | 1/1939 | Moncrieff | 123/193 CH |
| 2,311,329 | 2/1943 | Caminez | 123/193 C |
| 2,863,439 | 12/1958 | Bischel | 123/193 CH |

FOREIGN PATENTS OR APPLICATIONS 1,327,511    4/1963    France .........................92/169 UX

*Primary Examiner*—Edgar W. Geoghegan
*Assistant Examiner*—Irwin C. Cohen
*Attorney*—Walter Becker

[57] ABSTRACT

A dismantable cylinder-cylinder head unit, which includes a cylinder tube having its outer periphery provided with a buttress thread which is engaged by a threaded ring, which latter is cast between the cylinder head and said cylinder tube while said cylinder tube has an end face in sealing engagement with a sealing surface of a radially inwardly extending collar of said threaded ring, said sealing surface being spaced from the nearest winding of said buttress thread by a section of said cylinder tube which precisely fits into a corresponding portion of said threaded ring.

15 Claims, 3 Drawing Figures

Patented March 14, 1972

3,648,572

INVENTOR
Hans Fischer
BY
Walter Becker

DISMOUNTABLE CYLINDER FOR RECIPROCABLE PISTON MACHINES

The present invention relates to a dismantable cylinder head-cylinder unit for reciprocable piston machines, especially reciprocable piston operated internal combustion engines, in which the cylinder head is threadedly connected to the cylinder tube by means of a buttress thread provided on the outer mantle surface of the cylinder tube, and in which the end face of the cylinder tube engaged by the cylinder head in assembled condition serves as sealing surface.

While with air cooled reciprocable piston engines, especially reciprocable piston internal combustion engines, the single cylinder system predominates, this system is rarely employed with water cooled engines although this system may have advantages for cooling systems. Thus, for instance, piston engines of any desired number of cylinders may be means of manufacturing devices of corresponding small machining capacity economically be produced as in-series engines or as V-engines while employing a large number of standard parts and relatively small dimensions. Dismantable individual cylinders permit the structural design of the structural elements with regard to their shape and material in conformity with the respective stresses and requirements with less compromises than it is possible with block engines. Therefore, the invention is not limited to air cooled engines.

For purposes of connecting the cylinder head with the cylinder tube, various solutions have been advanced. Most frequently, such connection is effected by a number of screws which are symmetrically or uniformly distributed about the cylinder as far as possible. When such screws have such a length that they connect the cylinder head to the crank housing and thus subject the cylinder axially only to pressure stresses, a bending stress and thereby a deformation of the cylinder head will result in view of the unavoidable relatively great distance of the screws from the sealing surface between the cylinder and the cylinder head. Such an arrangement is disadvantageous above all with light metal cylinder heads which are adapted under the influence of higher temperatures to expand differently over the pertaining mostly cooler cylinder so that a proper sealing is made more difficult or may even be made impossible. When these screws are not tightened uniformly, a deformation of the cylinder may result unless the cylinder is very rigid which means is unnecessarily heavy.

The radial distance between the screws and the cylinder axis and the bending stresses to which the cylinder head is subjected as a result thereof may be reduced by connecting the cylinder head through screws to a flange at the upper end of the cylinder or to corresponding eyes. With this design, however, it is necessary to make the cylinder tube very stiff and thereby very heavy in order to be sure that the forces resulting from the combustion pressure and subjecting the screws to pull will not bring about an undesired deformation of the cylinder.

The drawbacks common to the above mentioned two screw connections consist in that they require relatively large distances between the respective adjacent cylinders and thus bring about an undesired great length of the engines. In view of the arrangement of threaded bores in the cylinder head, the optimum solutions for the provision of the flow passages, of the injection nozzles and other structural elements, such as an efficient guiding of the cooling medium, such as water or air, will be made more difficult.

In an effort to obtain a better seal, it has been suggested to provide a cylinder tube of steel at that end thereof which faces the cylinder head with an outer thread over which a pot-shaped cylinder bottom of a beryllium alloy is screwed or shrunk. This design, however, has the drawback that a later disconnection of the cylinder head for a possible post-machining is, for all practical purposes, impossible. In view of the shape of the thread there is furthermore obtained the disadvantage that particularly in view of the gas pressure prevailing in the cylinder, the thread of the cylinder head is exposed to a radially outwardly directed thrust while the upper end of the cylinder tube is subjected to a radially inwardly directed push or thrust. These forces may, on one hand, cause a widening of the cylinder head and thereby a leakage of gas or, on the other hand, may bring about a constriction of the cylinder at the threaded area. This construction is not desired at all in view of the danger that the piston will jam.

There has furthermore become known an air cooled dismantable cylinder for piston engines in which a cylinder head of steel is by means of a buttress thread provided on the outer mantle surface of the cast iron cylinder tube connected to the cylinder tube, and in which that end face of the cylinder tube which is engaged by the cylinder head in assembled condition of the latter, serves as sealing surface. On the steel cylinder head there is mounted a cooling jacket of light metal which cooling jacket may be cast onto the cylinder head or may be fitted thereinto by a press fit. Such a connection has the advantage that the cylinder head is at any time detachable if a post-machining or other working operations should require such detachment. Furthermore, a relatively short distance can be maintained between two adjacent cylinders. In view of the selection of the buttress thread or the supporting surfaces of the thread which are located perpendicular to the screwing direction—and this is important—the pulling forces created by the ignition pressure act upon the connection only in axial direction. Force components which are directed inwardly or outwardly no longer occur. However, the above mentioned connection has the drawback that in view of the fact that the cylinder head consists of steel, the heat withdrawal is poorer than, for instance, with a light metal head. Moreover, the entire construction is heavier, and the connection is in view of its sealing feature suitable only for lower pressure and temperature stresses. In order to secure a satisfactory seal between the cylinder tube and the cylinder head, it is necessary to firmly tighten the screw connection.

It is, therefore, an object of the present invention to provide a dismantable single cylinder of the above mentioned type, in which the cylinder head is by means of a buttress thread detachably connected to the cylinder tube, and in which the end face of the cylinder tube is designed as a sealing surface, while the above mentioned drawbacks will be avoided, i.e., the connection will remain gastight even when high pressures and temperatures occur.

It is another object of this invention to provide a dismantable single cylinder as set forth in the preceding paragraph, in which a distortion of the cylinder as a result of excessively tightened screws will be avoided.

It is still another object of this invention to provide a dismantable single cylinder in which a tight connection of the elements will be assured regardless of the selection of the material for the cylinder and for the cylinder head so that other factors as, for instance, the withdrawal of heat, can be given better consideration.

These and other objects and advantages of the invention will appear more clearly from the following specification in connection with the accompanying drawings, in which.

Figure 1:
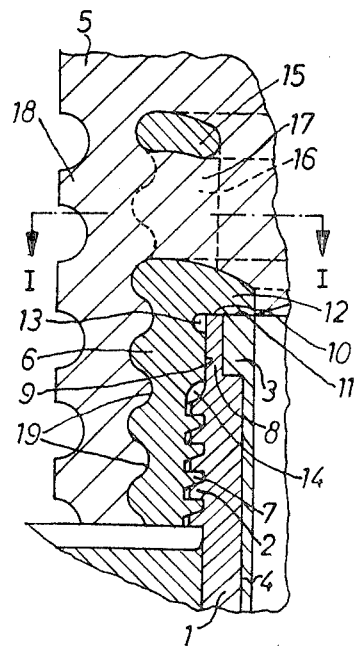
FIG. 1 represents a longitudinal section through a connection according to the invention of a cylinder head with a cylinder tube while a satisfactory gas seal is assured by expansion chambers following a firmly engaging contact surface.

The dismantable cylinder according to the present invention is characterized primarily in that the nut thread engaging the buttress thread of the cylinder tube and the counter sealing surface engaging the end surface of the cylinder tube are provided in a threaded ring of great strength which is positively cast into the cylinder head, and is furthermore characterized in that the cylinder tube between the sealing end face and the start of the buttress thread has a neck which serves as radial guiding means and precisely fits into a bore of the threaded ring. The dismantable cylinder according to the present invention is furthermore characterized in that additional expansion chambers and/or chambers receiving sealing means are located in the bore of the threaded ring which engages the neck of the cylinder tube. The material for the threaded ring should preferably be such that its heat expansion coefficient has a value between that of the cylinder head and that of the cylinder tube while being as close as possible to the heat expansion coefficient of the material from which the cylinder head is made so as to assure a permanent firm connection of both parts at the respective temperature variations. In order to increase the axial frictional connection between the cylinder head and the threaded ring, the threaded ring is additionally provided at its outer mantle with concentric grooves or a roughened surface.

By casting-in the threaded ring, it will be possible to employ a good heat conductive material, such as a light metal alloy, for the cylinder head. In this specific instance, a bronze alloy of high strength and a heat expansion coefficient only slightly below that of light metal has proved particularly suitable as material for the threaded ring in the present case. As material for the cylinder tube there is generally selected steel inasmuch as it will be able to absorb radially as well as axially acting gas forces and will also be able to convey these forces from the cylinder head to the crank housing. Furthermore, the cylinder tube has to absorb the sliding pressure of the piston.

For increasing the heat flow or heat withdrawal and for an additional positive connection with the cylinder head, the threaded ring is provided with passages which are uniformly distributed over the circumference and through which the light metal flows during the casting operation of the threaded ring and thus forms solid transverse bridges. In this way, in addition to a force conveying annular surface at the upper end of the threaded ring, there is created a heat bridge which interlocks the threaded ring and the light metal and extends from the cylinder head to the cooling ribs or the like on the outside of the cylinder head.

In view of radially guiding the cylinder tube which guiding action is effected by the neck fitted into a bore of the threaded ring, it will be appreciated that when screwing the cylinder head onto the cylinder tube, no radial forces will occur which could lead to a deformation of the cylinder tube and also of the cylinder bushing or sleeve if such is employed.

A cylinder bushing or sleeve provided with an upper collar can easily exchangeably be installed in the cylinder tube in which instance the upper end surface forms a sealing plane with the end surface of the cylinder tube upon which sealing plane the counter surface of the threaded ring will press whereby the cylinder bushing will be firmly held in its seat.

In view of the expansion chambers which expediently are provided at the upper and lower end of the bore and are separated from each other by the cylinder tube closely engaging the neck, an additional sealing labyrinth is formed. If this labyrinth seal which is provided in addition to the end face seal between the cylinder head and the cylinder tube, in view of the pressures and temperatures prevailing in the cylinder during operation, does not bring about a satisfactory seal, it is suggested, in conformity with a further development of the invention, to press a known or standard metallic or plastic sealing substance into the expansion chamber provided above the buttress thread and into the hollow chambers of the thread windings between the thread tips and the bottom of the thread, after the cylinder has been firmly screwed onto the tube. If such sealing substance or sealing medium which may, for instance, be tetrafluoroethylene, has been properly selected, a detachment of the cylinder head is possible whenever desired.

Finally it is suggested in conformity with the present invention to connect the two expansion chambers to each other through longitudinal grooves provided in the bore of the threaded ring so that the pressed-in sealing medium may pass through these longitudinal grooves also into the upper expansion chamber.

It is, of course, also possible, instead of the pressed-in sealing means to insert into the expansion chamber a sealing ring which has been properly fitted for the respective conditions.

In view of the above features, the screw connection according to the invention will be gastight, and a deformation of the cylinder tube will be impossible so that all requirements to be met by a connection of the cylinder tube with the cylinder head are actually met while the selection of the material for the cylinder and the cylinder head is no longer, in contrast to heretofore known constructions, important for a tight seal. Instead, the selection of the respective materials can be made in consideration of other conditions.

Referring now to the drawing in detail, FIG. 1 shows the upper portion of a cylinder tube 1 made of steel the outer mantle surface of which is provided with a buttress thread 2. Inserted into the cylinder tube 1 is a thin-walled bushing 4 which consists of cast iron and has its upper end provided with a flange 3. A threaded ring 6 is cast into a likewise only partially shown cylinder head 5 of a light metal alloy. The cast-in threaded ring 6 is frictionally and positively located in the cylinder head 5 and is provided with a nut thread 7 in conformity with the buttress thread 2 and thus is connected to the cylinder tube 1. The radial surface of the buttress or nut thread 2, 7 is, in a manner known per se, so selected that the pulling surfaces which are created by the ignition pressure will between the cylinder tube 1 and the cylinder head 5 have no radially effective components.

Above the buttress thread 2, the cylinder tube 1 has a neck 8 which as to its outer diameter corresponds to the core diameter of the buttress thread 2. Neck 8 is with a well fitting seat radially guided in a bore 9 of the threaded ring 6. The upper end face 10 of the cylinder tube 1 together with the end face 11 of flange 3 or bushing 4 forms a plane sealing surface engaged in axial direction by a strong collar 12 of the threaded ring 6. In view of the thus formed contact surface, there is created a first seal between the cylinder tube 1 and the cylinder head 5, which seal seals the ignition chamber and may be termed an ignition or flame trap.

The bore 9 which guides the neck 8 of the threaded tube 11 and closely engages the same has its upper and lower ends provided with annular undercuts 13, 14 which serve as expansion or labyrinth chambers whereby a further seal is effected.

The threaded ring 6 which is firmly cast into the cylinder head 5 may consist, for instance, of a bronze alloy. Its upper completely cast-in end has a strong ring 15 the bottom side of which takes over the power transfer proper to the cylinder tube 1. Ring 15 is by means of a number of vertical webs 16 connected to the collar 12 or the threaded ring 6 proper.

Figure 2:
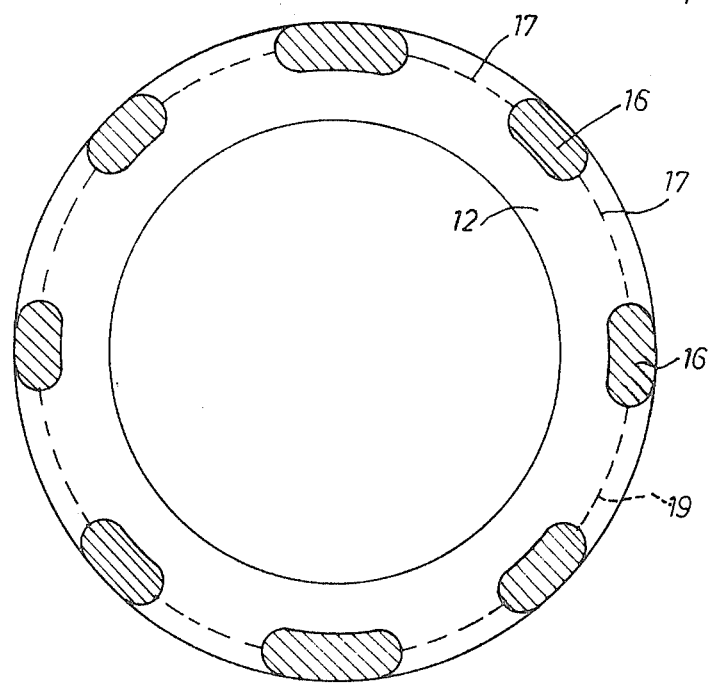
FIG. 2 is a section taken along the line II—II of FIG. 1 and illustrates the design of the threaded ring according to the invention.

As will be seen from FIGS. 1 and 2, between the webs 16 there are provided considerably wider passages 17 which are filled completely by the light metal of the cylinder head 5 so that in addition to shearing cross sections which contribute to the strength of the structure, there is created an effective multiple heat bridge to the cooling fins 18 which convey the heat away from the cylinder head 5. The ratio of the total surface of the web cross sections 16 between ring 15 and collar 12 to the total surface of the light metal filling in openings 17, which total surface is subjected to pressure and shearing forces, is so selected that the pressure and shearing stresses admissible for light metal as well as the admissible strength of the webs 16 will not be exceeded by the occurring temperatures. The total outer mantle surface of the threaded ring 6 which is surrounded throughout by light metal of the cylinder head 5 is for purposes of a better connection of the two materials provided with grooves 19.

Figure 3:
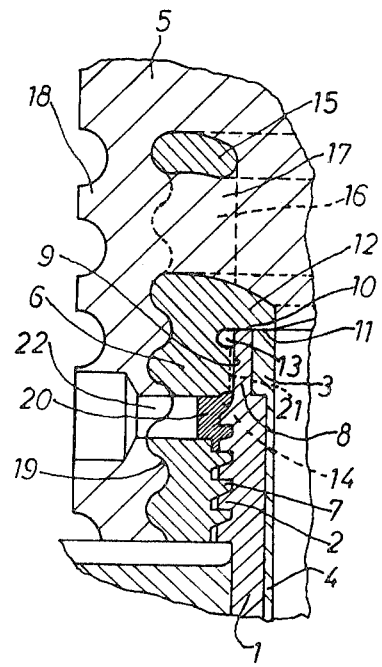
FIG. 3 illustrates the connection of FIG. 1 but with an additional sealing insert.

FIG. 3 shows a further development of the seal according to FIG. 1 and is characterized in that a metallic or plastic sealing substance or means 20 is pressed into the expansion chamber 14 which is adjacent to the upper end of the buttress thread 27. This sealing means 20 which has been inserted under high pressure also enters into the hollow chambers between the threads 2, 7 and fills the same. Furthermore, the two expansion chambers 13, 14 are interconnected by individual longitudinal grooves 21 distributed over the circumference so that the sealing means 20 will be able also to enter into the upper expansion chamber 13. For purposes of pressing the sealing means 20 into the expansion chamber 14, there is provided a bore 22 which extends through the cylinder head 5 and threaded ring 6 and while being accessible from the outside, is adapted to be closed.

A further modification of the invention is characterized in that instead of the pressed-in sealing means 20 there is inserted a corresponding temperature resistant sealing ring of any suitable material.

It is, of course, to be understood that the present invention is, by no means, limited to the particular showings in the drawing but also comprises any modifications within the scope of the appended claims.

What I claim is:

1. A dismantable cylinder-cylinder head unit for reciprocable piston engines, especially reciprocable piston internal combustion engines, which includes: cylinder tube means having its outer periphery provided with a buttress thread, a cylinder head, and a threaded ring interlocking with said cylinder head and mating with said buttress thread, said threaded ring having a radially inwardly extending collar comprising a sealing surface, and said tube means having an end face in sealing engagement with said sealing surface and spaced from the nearest winding of said buttress thread by a section of said tube means which has an outer peripheral surface precisely engaging into a correspondingly shaped section of said threaded ring, portions of said peripheral surface and the correspondingly shaped section of said threaded ring means confining with each other relatively small chamber means for aiding in establishing a seal between said cylinder and said cylinder head.

2. A dismantable cylinder-cylinder head unit for reciprocable piston engines, especially reciprocable piston internal combustion engines, which includes: cylinder tube means having its outer periphery provided with a buttress thread, a cylinder head, and a threaded ring interlocking with said cylinder head and mating with said buttress thread, said threaded ring having a radially inwardly extending collar comprising a sealing surface, and said tube means having an end face in sealing engagement with said sealing surface and spaced from the nearest winding of said buttress thread by a section of said tube means which has an outer peripheral surface precisely engaging into a correspondingly shaped section of said threaded ring, portions of said peripheral surface and the correspondingly shaped section of said threaded ring means confining with each other relatively small chamber means for aiding in establishing a seal between said cylinder and said cylinder head, said threaded ring being cast into said cylinder head and in adjoining relationship to said buttress thread.

3. A dismantable cylinder-cylinder head unit for reciprocable piston engines, especially reciprocable piston internal combustion engines, which includes: cylinder tube means having its outer periphery provided with a buttress thread, a cylinder head, and a threaded ring interlocking with said cylinder head and mating with said buttress thread, said threaded ring having a radially inwardly extending collar comprising a sealing surface, and said tube means having an end face in sealing engagement with said sealing surface and spaced from the nearest winding of said buttress thread by a section of said tube means which has an outer peripheral surface precisely engaging into a correspondingly shaped section of said threaded ring, portions of said peripheral surface and the correspondingly shaped section of said threaded ring means confining with each other relatively small chamber means for aiding in establishing a seal between said cylinder and said cylinder head, and sealing means inserted in said chamber means.

4. A dismantable cylinder-cylinder head unit for reciprocable piston engines, especially reciprocable piston internal combustion engines, which includes: cylinder tube means having its outer periphery provided with a buttress thread, a cylinder head, and a threaded ring interlocking with said cylinder head and mating with said buttress thread, said threaded ring having a radially inwardly extending collar comprising a sealing surface, and said tube means having an end face in sealing engagement with said sealing surface and spaced from the nearest winding of said buttress thread by a section of said tube means which has an outer peripheral surface precisely engaging into a correspondingly shaped section of said threaded ring, portions of said peripheral surface and the correspondingly shaped section of said threaded ring means confining with each other relatively small chamber means for aiding in establishing a seal between said cylinder and said cylinder head, the diameter of said outer peripheral surface of said section substantially equaling the core diameter of said buttress thread.

5. A dismantable cylinder-cylinder head unit for reciprocable piston engines, especially reciprocable piston internal combustion engines, which includes: cylinder tube means having its outer periphery provided with a buttress thread, a cylinder head, and a threaded ring interlocking with said cylinder head and mating with said buttress thread, said threaded ring having a radially inwardly extending collar comprising a sealing surface, and said tube means having an end face in sealing engagement with said sealing surface and spaced from the nearest winding of said buttress thread by a section of said tube means which has an outer peripheral surface precisely engaging into a correspondingly shaped section of said threaded ring, portions of said peripheral surface and the correspondingly shaped section of said threaded ring means confining with each other relatively small chamber means for aiding in establishing a seal between said cylinder and said cylinder head, said chamber means being formed by annular undercuts located at the ends of said section of said tube means which precisely fits into a correspondingly shaped section of said threaded ring.

6. A unit according to claim 5, which includes an elastic sealing ring located in that undercut which is adjacent to the thread winding closest to said section of said tube means which precisely fits into a correspondingly shaped section of said threaded ring.

7. A dismantable cylinder-cylinder head unit for reciprocable piston engines, especially reciprocable piston internal combustion engines, which includes: cylinder tube means having its outer periphery provided with a buttress thread, a cylinder head, and a threaded ring interlocking with said cylinder head and mating with said buttress thread, said threaded ring having radially inwardly extending collar comprising a sealing surface, and said tube means having an end face in sealing engagement with said sealing surface and spaced from the nearest winding of said buttress thread by a section of said tube means which has an outer peripheral surface precisely engaging into a correspondingly shaped section of said threaded ring, portions of said peripheral surface and the correspondingly shaped section of said threaded ring means confining with each other relatively small chamber means for aiding in establishing a seal between said cylinder and said cylinder head, conduit means extending from the outside of said cylinder head through said threaded ring to both said thread windings adjacent said section of said tube means which precisely fits into a correspondingly shaped section of said threaded ring and that chamber means which is closest to said buttress thread for pressing a sealing substance into said thread windings and the chamber means adjacent thereto.

8. A unit according to claim 5, which includes connecting passage means provided in said threaded ring and establishing communication between said undercuts.

9. A unit according to claim 8, which includes sealing material located in that undercut which is closest to said end face of said tube means.

10. A dismantable cylinder-cylinder head unit for reciprocable piston engines, especially reciprocable piston internal combustion engines, which includes: cylinder tube means having its outer periphery provided with a buttress thread, a cylinder head, and a threaded ring interlocking with said cylinder head and mating with said buttress thread, said threaded ring having a radially inwardly extending collar comprising a sealing surface, and said tube means having an end face in sealing engagement with said sealing surface and spaced from the nearest winding of said buttress thread by a section of said tube means which has an outer peripheral surface precisely engaging into a correspondingly shaped section of said threaded ring, portions of said peripheral surface and the correspondingly shaped section of said threaded ring means confining with each other relatively small chamber means for aiding in establishing a seal between said cylinder and said cylinder head, a cylinder bushing being inserted into said cylinder tube having a flanged portion engaging a corresponding recess in said cylinder tube, the outer end face of said flanged portion being flush with said end face of said tube means.

11. A dismantable cylinder-cylinder head unit for reciprocable piston engines, especially reciprocable piston internal combustion engines, which includes: cylinder tube means having its outer periphery provided with a buttress thread, a cylinder head, and a threaded ring interlocking with said cylinder head and mating with said buttress thread, said threaded ring having a radially inwardly extending collar comprising a sealing surface, and said tube means having an end face in sealing engagement with said sealing surface and spaced from the nearest winding of said buttress thread by a section of said tube means which has an outer peripheral surface precisely engaging into a correspondingly shaped section of said threaded ring, portions of said peripheral surface and the correspondingly shaped section of said threaded ring means confining with each other relatively small chamber means for aiding in establishing a seal between said cylinder and said cylinder head, said threaded ring being of a material having a heat expansion coefficient of a value between that of the cylinder head and that of the cylinder tube while being as close as possible to the heat expansion coefficient of the material making up said cylinder head.

12. A dismantable cylinder-cylinder head unit for reciprocable piston engines, especially reciprocable piston internal combustion engines, which includes: cylinder tube means having its outer periphery provided with a buttress thread, a cylinder head, and a threaded ring interlocking with said cylinder head and mating with said buttress thread, said threaded ring having a radially inwardly extending collar comprising a sealing surface, and said tube means having an end face in sealing engagement with said sealing surface and spaced from the nearest winding of said buttress thread by a section of said tube means which has an outer peripheral surface precisely engaging into a correspondingly shaped section of said threaded ring, portions of said peripheral surface and the correspondingly shaped section of said threaded ring means confining with each other relatively small chamber means for aiding in establishing a seal between said cylinder and said cylinder head, that end portion of said threaded ring which is farthest away from said cylinder tube having connected thereto a strong annular member adapted to convey the ignition pressure acting upon the cylinder head to said cylinder tube.

13. A unit according to claim 12, in which said threaded ring forms a heat bridge and has its circumference provided with passages, and in which said annular member is, by means of webs, connected to the remaining portion of said threaded ring.

14. A dismantable cylinder-cylinder head unit for reciprocable piston engines, especially reciprocable piston internal combustion engines, which includes: cylinder tube means having its outer periphery provided with a buttress thread, a cylinder head, and a threaded ring interlocking with said cylinder head and mating with said buttress thread, said threaded ring having a radially inwardly extending collar comprising a sealing surface, and said tube means having an end face in sealing engagement with said sealing surface and spaced from the nearest winding of said buttress thread by a section of said tube means which has an outer peripheral surface precisely engaging into a correspondingly shaped section of said threaded ring, portions of said peripheral surface and the correspondingly shaped section of said threaded ring means confining with each other relatively small chamber means for aiding in establishing a seal between said cylinder and said cylinder head, the outer periphery of said threaded ring being provided with coaxial grooves.

15. A dismantable cylinder-cylinder head unit for reciprocable piston engines, especially reciprocable piston internal combustion engines, which includes: cylinder tube means having its outer periphery provided with a buttress thread, a cylinder head, and a threaded ring interlocking with said cylinder head and mating with said buttress thread, said threaded ring having a radially inwardly extending collar comprising a sealing surface, and said tube means having an end face in sealing engagement with said sealing surface and spaced from the nearest winding of said buttress thread by a section of said tube means which has an outer peripheral surface precisely engaging into a correspondingly shaped section of said threaded ring, portions of said peripheral surface and the correspondingly shaped section of said threaded ring means confining with each other relatively small chamber means for aiding in establishing a seal between said cylinder and said cylinder head, said cylinder head being of a light metal alloy and said cylinder tube being of steel while said threaded ring is of a bronze alloy.

* * * * *